July 10, 1962  J. E. RUSSELL  3,044,020
FREQUENCY OR PHASE SHIFT DEMODULATOR
Filed July 7, 1959  3 Sheets-Sheet 1
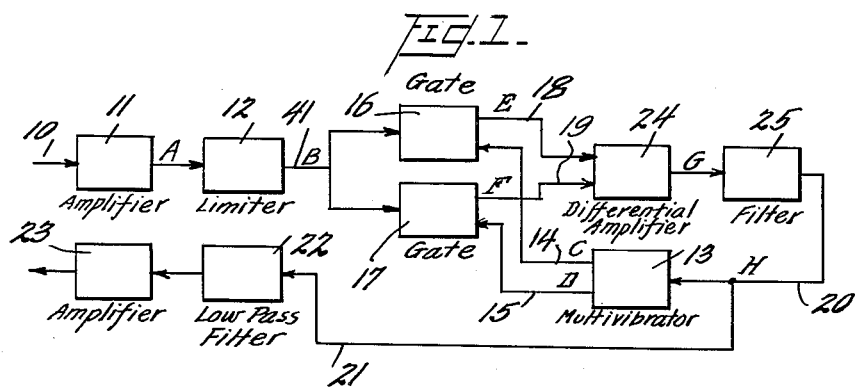
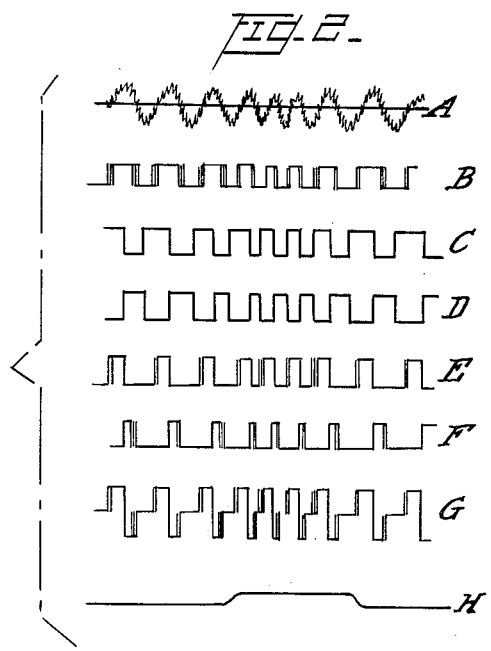
INVENTOR
James E. Russell,
BY Paris, Haskell and Levine
ATTORNEYS

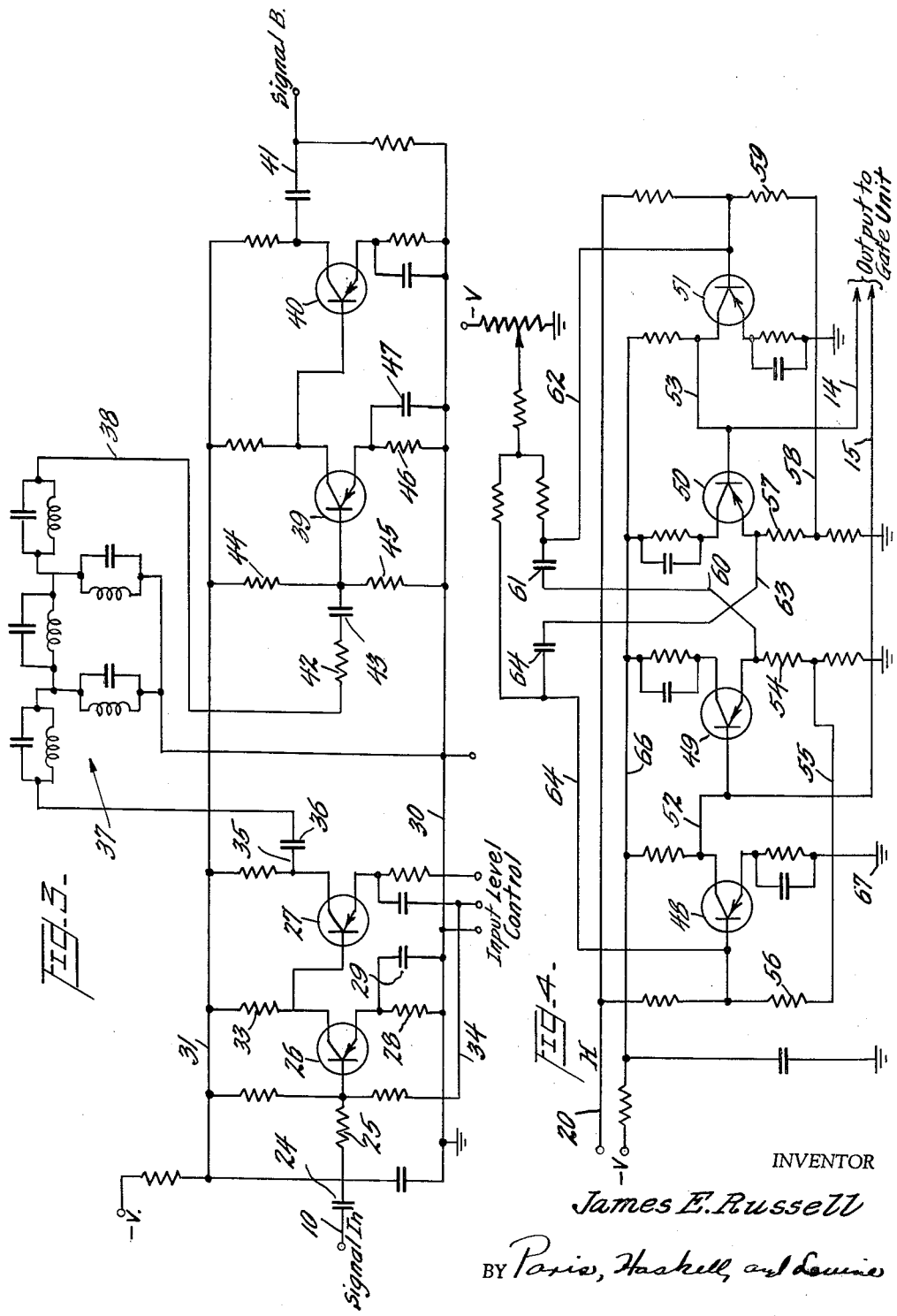

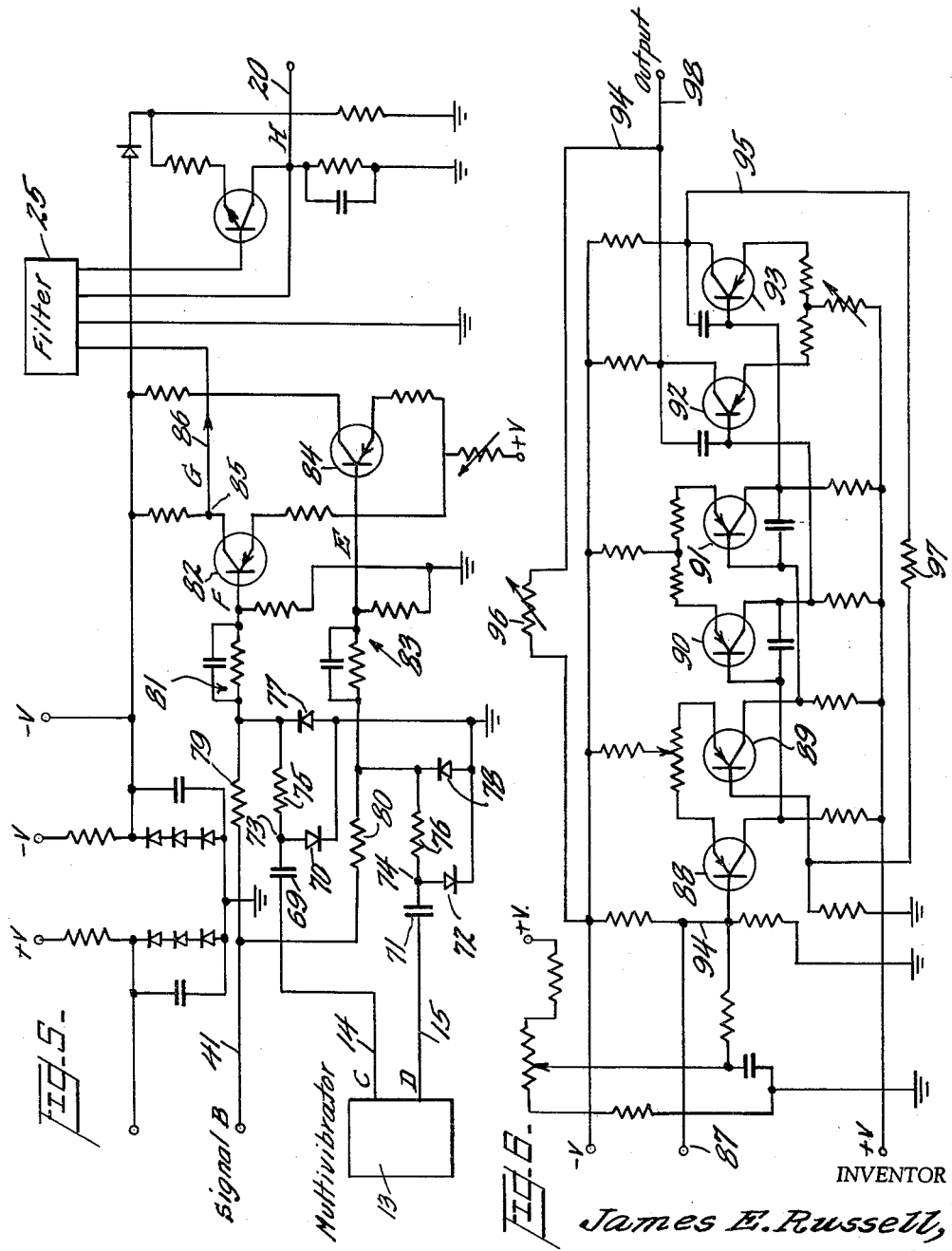

United States Patent Office

3,044,020
Patented July 10, 1962

3,044,020
FREQUENCY OR PHASE SHIFT DEMODULATOR
James E. Russell, Irving, Tex., assignor to Vector Manufacturing Co., Inc., a corporation of Pennsylvania
Filed July 7, 1959, Ser. No. 825,586
16 Claims. (Cl. 329—103)

This invention generally relates to improvements in FM subcarrier signal detectors finding great utility in telemetering systems, and is particularly concerned with eliminating the adverse effect of "white" noise, commonly experienced in long range radio transmission, thereby to increase the sensitivity of the detector to small radio signals and hence increase the range of radio transmission of intelligence without a proportional increase in the transmitting power.

It is accordingly a primary object of the invention to provide a system for detecting FM subcarrier signals under noise conditions sufficiently great as to render the signals normally unintelligible with conventional detectors.

In known radio telemetering systems for use in communicating information over long distances through air and space, considerable effort has been directed toward increasing the power of the transmitter and improving the efficiency of the transmitting and receiving antennas, as well as improving the detecting systems in an effort to extend the range or distance of radio communication. Where the transmitter is airborne or spaceborne aboard and aircraft or missile, the problems involved in increasing the radiated power produced by the transmitter become particularly acute since this involves a considerable increase in the size and weight of the transmitter, as well as in its power supply and associated equipment. Furthermore, as the range of communicaton is increased, the noise signals become progressively more troublesome and as a result it is more essential that the detectors are made more sensitive and selective to reject the spurious noise signals and respond only to the desired intelligence being transmitted.

It is accordingly a further object of the invention to provide an improved FM subcarrier detector for increasing the transmission range of a given telemetering system without requiring a change in the transmitting equipment.

A still further object of the invention is to provide an FM detector operable with a smaller signal to noise ratio.

A still further object is to provide such a detector that is small, lightweight, and compact for aircraft and related uses and that possesses a minimum number of operating components.

A still further object is to provide such a detector that is completely transistorized and temperature compensated.

Other objects and many attendant advantages will be more readily comprehended by those skilled in the art after a detailed consideration of the following specification taken with the accompanying drawings wherein:

FIG. 1 is an electrical block diagram representation of one preferred FM detector according to the present invention, FIG. 2 is a diagram illustrating the electrical waveforms being produced in the various circuits of FIG. 1, FIG. 3 is an electrical schematic diagram illustrating one preferred amplifier and limiter that may be employed in the detector of FIG. 1, FIG. 4 is an electrical schematic diagram illustrating a preferred master oscillator that may be employed in FIG. 1.

FIG. 5 is an electrical schematic diagram illustrating preferred gate circuits, differential amplifier, and filter circuits that may be employed in the detector of FIG. 1, and FIG. 6 is an electrical schematic diagram illustrating a preferred output amplifier that may be employed in the detector of FIG. 1.

Referring now to the drawings for a detailed consideration of one preferred detector system according to the present invention, there is shown in FIG. 1 a block diagram representation of the various component circuits and their manner of interconnection, and in FIG. 2 a series of waveforms, labeled A to H, inclusive, depicting, in sequence, the various changes in the received signal as it passes through the receiver.

Initially in the usual frequency modulation telemetering system, there is transmitted a number of channels or frequency bands carrying intelligence, and each employing a different subcarrier frequency operating in or near the audio frequency band. Consequently, the composite transmitted signal containing the several subcarrier frequency modulated signals is first directed over an input line 10 to an amplifier 11 having a bandpass filter for selecting the desired subcarrier signal and providing the necessary amplification thereof. The output of amplifier 11 is therefore a frequency modulated subcarrier signal generally having the waveform A, as illustrated on the uppermost time scale in FIG. 2. As generally shown by waveform A in FIG. 2, this frequency modulated signal is not a continuously variable FM signal having a true sinusoidal waveform and a constant peak amplitude as would be desired, but rather is quite jagged in waveform, fluctuating at any given time over a rather wide range due to the "noise" signals also being received and amplified by the amplifier 11.

The selected FM subcarrier signal obtained from amplifier 11 and containing the noise signal is then directed to a limiter circuit 12 which provides the function of clipping or limiting the amplitude of the signal, to provide essentially square wave, constant amplitude pulses of varying pulse width and spacing therebetween corresponding to the received FM signal, as depicted by waveform B in FIG. 2.

Observing waveform B more closely, it is noted that each pulse usually has a number of leading edges and a number of trailing edges. This condition results from the fact that in the signal as illustrated, the received noise signals are quite large with respect to the intelligence signal whereby as they pass through the limiter 12 along with the intelligence signal, their effect is to blur or obscure the leading edges and trailing edges of the clipped intelligence pulses by producing short spikes or impulses before and after the intelligence pulses. For this reason known FM detectors experience considerable difficulty in distinguishing between the noise and intelligence signals, and in instances where the noise components are as large in relation to the intelligence as shown in waveform B, known detectors are unable to clearly distinguish between the two.

According to the present invention, however, there is provided a detecting means which does not rely upon determining the exact location and time relation of the leading edges of the pulses for deriving the transmitted intelligence from the signal but rather relies upon the pulse width and other characteristics of the unidirectional impulses of waveform B, whereby the presence of the noise spikes at the edges of the pulses does not obscure the intelligence.

Returning again to FIGS. 1 and 2 for an understanding of this new manner of distinguishing the desired intelligence from the noise signal, there is provided a variable frequency master oscillator unit, such as a multivibrator 13, as shown, which is adapted to operate within the same frequency band as the selected FM modulated subcarrier signal, and is automatically regulated by the unidirectional intelligence pulses (waveform B) in such manner as to change frequency in correspondence with the change in frequency of the transmitted FM modulated subcarrier. In other words, there is provided a master oscillator 13 that is controlled to change frequency with the received FM signal and hence simulate the operation of the oscillator in the FM transmitter, whereby the signal varying the master oscillator 13 may then be used to derive the desired intelligence without interference from the large noise components.

The master oscillator 13 produces two series of square wave pulses over lines 14 and 15, with the first series of pulses over line 14 being 180 electrical degrees in advance of the impulses over line 15, and with both series of pulses being 90 electrical degrees out of phase with the unidirectional intelligence pulse (waveform B), as shown in FIG. 2.

The first series of standard impulses (waveform C) over line 14 is directed upwardly to turn on and off a gate circuit 16 and the second series (waveform D) over line 15 is directed to a similar gate circuit 17. Since the standard pulses over line 14 are 180 degrees in advance of those over line 15, it is evident that gates 16 and 17 are opened and closed in alternating sequence (in response to these pulses). That is, when gate 16 is opened gate 17 is closed, and the reverse. The intelligence pulses from limiter 12 (waveform B) are also directed to energize both gates 16 and 17, and these intelligence pulses or portions thereof alternately pass through the gates 16 and 17 in sequence, as the gates are alternately opened by the standard pulses over lines 14 and 15.

Assuming that the frequency variation of master oscillator 13 is the same as the received FM subcarrier wave, and that the standard pulses therefrom being directed over lines 14 and 15 are exactly displaced 90 degrees therefrom as shown in waveforms B, C, and D of FIG. 2, then the first half of each intelligence pulse (waveform B) will be passed by gate 16 over its output line 18 and the second half of each intelligence pulse of waveform B will be passed by gate 17 over its output line 19. This first half of the pulse is represented by waveform E in FIG. 2, and the second half thereof is represented in FIG. 2 by waveform F. In other words, assuming that the master oscillator 13 is in synchronism with the FM subcarrier, the clipped FM signal (waveform B) is divided into two equal parts, with the first part substantially equalling the first half of each pulse (waveform E) being transmitted by gate 16 over line 18 and with the second part, equalling the second half of each pulse (waveform F) being transmitted by gate 17 over line 19.

Continuing this assumption of synchronism between the master oscillator 13 and received FM subcarrier signal, it is evident that the energy contained in the first half pulses over line 18 must equal the energy contained in the second half pulses over line 19 and consequently if the pulses over line 18 are integrated and the result subtracted from the integrated pulses over line 19, the result would be zero, indicating that the master oscillator 13 is in synchronism with the received FM subcarrier signal.

On the other hand, if the received FM subcarrier signal varies, the master oscillator 13 loses synchronism with this signal, with the result that the FM signal is no longer divided into two equal energy pulse trains over lines 18 and 19, as before, but rather the pulses over line 18 may have either a greater pulse width than those being transmitted over line 19 or a lesser pulse width depending upon the direction of change of the FM intelligence signal. Consequently as the received FM signal varies, the energy contained in the pulses over line 18 increases or decreases with respect to that of the pulses over line 19, and subtracting one from the other provides an error signal representing the difference in frequency between the received FM signal and that of master oscillator 13.

To complete the follow-up loop and provide a continuous measure of the change in the received FM signal, this error signal being produced over line 20 is directed backwardly to energize the master oscillator 13 in such manner as to increase or decrease the frequency thereof and again bring the master oscillator 13 into synchronism with the received FM signal. Thus, there is provided an electrical servo or follow-up system to continuously maintain synchronism between a master oscillator 13 located in the FM detector system and that being located remotely in the FM transmitter (not shown). Since this error signal over line 20 serves to modulate or change the frequency of the master oscillator 13 to conform or bring it into synchronism with the transmitted FM subcarrier signal, it is evident that the error signal over line 20 performs the same function and must be identical with the remotely located intelligence signal modulating the transmitter subcarrier oscillator. Consequently, the error signal over line 20 is also the demodulated output signal from the detector of the present invention and is accordingly also directed over line 21 and through a low pass filter 22 and amplifier 23 to ultimately operate recorders, computers (not shown) or other means as well known in the art to perform its intended function.

Returning to FIGS. 1 and 2 for a more detailed consideration of the preferred manner of subtracting the energy of the two pulse trains being transmitted over lines 18 and 19 to obtain the desired error signal, lines 18 and 19 are connected to energize a differential amplifier unit 24 which serves to invert the pulses over line 19 and add these inverted pulses to those over line 18 to provide a substantially square wave alternating current signal, as shown by waveform G. By inverting or reversing the polarity of one series of pulses over that of the other, it is noted from waveform G that the noise signal spikes in one series of pulses are also inverted or made of opposite polarity than the spikes in the other. This square wave alternating signal (waveform G) is then directed to a filter 25 which functions to integrate the same thereby to obtain the desired error signal over line 20 (waveform H). Since the noise components of the signal are reversed during each half cycle of the alternating square wave (waveform G), it is evident that these noise signals substantailly cancel out one another during the integration process, thereby substantially eliminating the noise from the output signal 20. On the other hand, the opposite polarity pulses (waveform G) being obtained from the two series of pulses (waveforms E or F) will not be of equal energy content unless no intelligence signal is being transmitted, since, as discussed above, the intelligence signal modulates or varies the frequency of the FM subcarrier, thereby taking it out of synchronism with the master oscillator 13 to render waveform G asymetrical.

Thus according to the present invention, there is provided a master oscillator or multivibrator 13 in the FM detector, whose frequency is continuously compared to that of the received FM signal and the difference thereof is employed to vary the frequency of the master oscillator to conform or bring it into synchronism with the variations in the received FM signal. In making this comparison, the leading edges of the received FM signal are not directly employed, but rather the pulse width of the individual cycles thereof, with the net result that the spurious noise signals or spikes are rejected and thus prevented from contaminating the received signal to obscure the transmitted intelligence.

As thus far described, therefore, it is believed evident that the amplitude or magnitude of the noise signals are essentially immaterial in effecting the operation of the receiver, since only the pulse width thereof or, more exactly, the difference between the energy contained in the leading edge noise spikes and that of the trailing edge noise spikes, can affect the error signal or output of the detector. Consequently the FM receiver according to the present invention may respond to signals having a considerably higher noise-to-signal ratio than known FM detectors and hence respond to FM signals transmitted over greater distances than known receivers.

Thus according to the present invention, there is provided a master oscillator or multivibrator 13 in the FM detector, whose frequency is continuously compared with the received FM signal and the difference thereof is employed to vary the frequency of the master oscillator 13 in such manner as to conform or bring it into synchronism with the variations in the received FM signal. In making this comparison, the leading edges of the received FM signal are not directly employed but rather the pulse width of the individual cycles is used, with the net result that the spurious noise signals or spikes are rejected and thereby prevented from contaminating the received intelligence to obscure the transmitted intelligence. As thus far described, therefore, it is believed evident that the amplitude or magnitude of the noise signals is essentially immaterial in affecting the operation of the receiver, since only the pulse width thereof or, more exactly, the difference between the energy contained in the leading edge noise spikes and that of the trailing edge noise spikes, can affect the error signal or output of the receiver. Consequently, according to the present invention, the FM detector may respond to signals having a considerably higher-noise-to-signal ratio than known detectors and hence may respond to FM signals being transmitted over greater distances than presently available detection.

According to a preferred embodiment of the invention, the system of FIG. 1 is preferably comprised of completely transistorized circuits for the purpose of reducing the size, weight, and power consumption thereof, as well as improving its shock and acceleration resistance, all of which are essential for mobile operation in aircraft or missiles.

Referring to FIG. 3 for a detailed consideration of preferred amplifier and limiter circuits, generally shown as blocks 11 and 12 in FIG. 1, the received FM signal being admitted over line 10 is first directed through a coupling capacitor 24 and coupling resistor 25 leading to the base element of a first transistor 26, of a pair of direct current coupled transistor amplifiers, including transistors 26 and 27.

The emitter element of transistor 26 is suitably self-biased by means of parallel connected resistor and capacitor 28 and 29 having their opposite ends connected to ground 30, and the collector element of transistor 26 is connected to a suitable source of potential existing on line 31, and being connected thereto through a collector resistor 33. The base element of the second transistor 27 is energized by the collector element of the first transistor 26, and the emitter and collector elements of the second transistor 27 are connected to a biasing potential and to the power supply line 31, respectively. To thermally stabilize the transistors 26 and 27 and to provide the desired gain control, negative feedback leading from the emitter element of transistor 27 and through a capacitor is provided backwardly over line 34 to energize the base element of the first transistor 26, as shown.

The output of the second transistor amplifier 27, taken from the collector element thereof is thence transmitted over line 35 and through a coupling capacitor 36 to the input of a multistage band pass filter generally designated 37, which serves the purpose of selecting the frequency band of the desired subcarrier modulated FM signal. As shown, the band pass filter unit 37 may comprise a conventional multistage series of legs each including capacitors and inductors in appropriate relation.

As thus far described, therefore, the input FM signal being received over line 10 is first amplified by transistors 26 and 27 and thence directed to a multistage band pass filter to select the desired subcarrier signal.

The output of the selected subcarrier FM signal taken from the band pass filter 37 is thence transmitted over line 38 leading therefrom to the base element of transistor 39 which in turn is coupled to a second transistor 40. The function of transistors 39 and 40 is to provide a two stage high gain saturation clipping of the signal thereby to produce an output signal over line 41 having a waveform substantially as illustrated in waveform B of FIG. 2. Tracing this circuit more specifically, the signal taken from the band pass filter over line 38 is directed through a coupling resistor 42 and coupling capacitor 43 to energize the base element of first clipper transistor 39. Transistor 39 has its base element suitably biased by being connected to the central junction of a potential divider, consisting of resistors 44 and 45 connected in series across energized power supply line 31 and ground line 30. This biasing of the base element of transistor 39, together with the self-biasing of its emitter described below, controls the conduction from its emitter to its collector elements in such manner as to clip or limit the FM signal and produces the waveform B of FIG. 2. The self-biasing of its emitter element is obtained by means of the parallel connected resistor 46 and capacitor 47 interconnecting the emitter element of transistor 39 to ground. The second transistor 40 provides the second stage of the high gain saturating clipping function whereby the output signal being produced over line 41 is the square wave signal having the waveform B in FIG. 2.

In FIG. 4 there is shown a preferred master oscillator or multivibrator circuit, generally illustrated as block 13 in FIG. 1. Referring to FIG. 4, there is provided two pairs of transistors 48, 49 and 50, 51. The transistors of the first pair 48, 49 are connected in cascade by directly connecting the collector element of transistor 48 to the base element of transistor 49 over line 52; and the second pair of transistors 50 and 51 are likewise connected in cascade by connecting the collector of transistor 51 to the base of transistor 50 over line 53, as shown.

Feed back connections are also provided in each pair for temperature stabilization. In the first pair the feed back comprises connecting the emitter element of transistor 49 backwardly to the base element of transistor 48 through a resistor 54, conductor 55 and a second resistor 56. In a similar manner in the second pair there is provided a feed back connection from the emitter of transistor 50 through resistor 57, and over line 58 and through a second resistor 59 to the base element of transistor 51.

Each of these two pairs of cascaded transistors are also connected in feed back with the other to form a multivibrator as desired, and such connection may be traced from the emitter of transistor 49 over line 60, and thence through capacitor 61 of a tuning unit, and over line 62 to the base element of transistor 51. Feed back in the opposite direction is provided from the emitter element of transistor 50 over line 63 and thence through capacitor 64 and over line 65 to the base element of transistor 48.

Both pairs of transistors 48, 49 and 50, 51 are also suitably biased and energized from the power supply lines 66 and ground lines 67 to supply the necessary energizing and biasing to enable the oscillator circuit to function as desired. The control signal received over line 20 is directed to both the base element of transistor 48 in the first pair and to the base element of transistor 51 of the second pair, thereby to vary the frequency of the multivibrator according to the input signal over line 20.

As thus far described, therefore, the preferred multivibrator unit is preferably comprised of a pair of two stage amplifiers connected back to back with the output transistor of each pair having its emitter element connected to the input of the second pair thereby to provide a free running multivibrator. The purpose of providing the two stage amplifiers in back-to-back relation, is to provide temperature compensation whereby the frequency of this multivibrator is substantially invariable over a temperature range of about 50 to 110° F. As generally described above, the frequency of this multivibrator is controllable over a wide range in accordance with the input signal received over line 20. To obtain two square wave outputs from this multivibrator, each of which is 180° out of time phase with the other, signals may be taken from the input to the second stage of each pair and directed over lines 14 and 15, as shown. By properly selecting values of the components in the circuit of FIG. 4, it has been found that the frequency being produced by the oscillator may be varied linearly with a variation of the signal received over line 20.

In FIG. 5 there is shown a preferred transistor circuit for the gate circuits 16 and 17 of FIG. 1, the differential amplifier circuit 24 of FIG. 1 and the connections to the filter unit 25 of FIG. 1. As shown, the two phase displaced standard square wave pulses from master multivibrator unit 13 are introduced over input lines 14 and 15. The square wave master signal over line 14 is directed upwardly through a coupling capacitor 69 and diode 70 which together form a clamping circuit. Similarly the opposite phase signal over line 15 is directed to capacitor 71 and diode 72 similarly forming a clamping circuit to pass only pulses of the correct polarity. The voltage existing at the junction 73 of elements 69 and 70 substantially has a wave form labeled C in FIG. 2 and the potential at junction point 74 between clamping element 71 and 72 has substantially the waveform labeled D in FIG. 2.

The standard pulse signal at junction 73 is thence directed to a summing resistance 75 and the standard pulse from junction 74 is similarly directed to summing resistance 76. The summing resistances 75 and 76 are each connected to oppositely poled diodes 77 and 78, respectively, forming part of the gate circuits 16 and 17, respectively, of FIG. 1. The FM received signal being transmitted over line 41 (output of FIG. 3) is directed to two resistors 79 and 80 each of which has an opposite terminal connected to the reversely poled diodes 77 and 78, respectively. With this arrangement, whenever the potential at clamping junction 73 is positive, the signal over line 41 is permitted to pass through the gate and through a coupling circuit generally designated 81 to the base of a transistor 82. Similarly, whenever the potential at clamping junction 74 is positive, the input signal over line 41 is permitted to pass through a coupling circuit generally designated 83 to the base element of a second transistor 84. As generally described above in connection with block diagram of FIG. 1, the multivibrator standard signals being produced over lines 14 and 15 are 180° out of time phase whereby the signals at clamping junctions 73 and 74 are likewise 180° out of phase. As a result the clipped and limited FM signal being introduced over line 41 is alternately permitted to pass to transistor 82 during approximately one-half of each cycle and is alternately permitted to pass to transistor 84 during the second half of each pulse cycle.

Transistors 82 and 84 are so connected that transistor 82 inverts or reverses the polarity of impulses received at its base element and combines this inverted pulse with the pulse received at the base element of transistor 84, with the net result that the combined inverted half pulse and non-inverted half pulse are both summed at the junction 85 and the signal therefor being transmitted over line 86 thus is substantially identical with waveform G of FIG. 2. Thus the function of transistors 82 and 84 is to serve as a differential amplifier for receiving each of the half pulses from gate circuits 16 and 17, inverting one of the half pulses with respect to the other and summing the difference, thereby to produce the alternating pulse waveform of waveform G of FIG. 2 over line 86. The signal over line 86 is then directed upwardly to a low pass filter 25 which effectively integrates waveform G to produce the error signal over line 20 and having a waveform substantially identical with waveform H of FIG. 2.

As generally discussed above, in connection with FIG. 1, the error signal being produced over line 20 is proportional to the difference in frequency between the received FM signal and the standard frequency signal being produced by multivibrator 13. This signal is directed backwardly to control the frequency of the master multivibrator unit 13 (over the same line 20) thereby to again bring the frequency of the multivibrator unit 13 into coincidence with the detected FM signal.

The error sginal over line 20 is also the desired demodulated intelligence signal, as discussed above, and is consequently also directed to a low pass filter 22 (FIG. 1) for the purpose of removing any further spurious variation of the subcarrier, and thence is directed to a power amplifier 23.

One such preferred power amplifier circuit is shown in FIG. 6. In FIG. 6, the filtered output signal from low pass filter 22 is received over line 87 and directed in cascade through three pairs of transistors 88, 89; 90, 91; and 92, 93. Each of these pairs of transistors such as 88, 89 and 92, 93 are connected in an emitter follower arrangement, with the emitter element of the first transistor 88 being connected to the emitter element of the second transistor thereby to provide the first pair. The second pair of transistors 90, 91 is also connected in a similar emitter follower arrangement, as is the third pair 92, 93. The collector element of the first transistor 88 of the first pair, is also directly coupled to the base element of the first transistor 90 of the second pair, and the collector output of the latter transistor 90 is likewise directly connected to the base element of the first transistor 92 of the third pair. In a similar manner, the collector output of the second transistor 89 of the first pair is directly coupled to the base element of the second transistor 91 of the second pair, and the collector element of the latter is likewise connected to the base element of the second transistor of the third pair. With this arrangement, it is evident that the three pairs of transistors are connected in a differential arrangement with the first transistor element of each pair constituting one channel and the second transistor element of each pair constituting the second channel of a differentially connected multistage power amplifier. Feed back connections are also provided between the last transistor in each channel and the first transistor of that channel, all for the purpose of providing stabilized feed back in each channel and temperature compensations. For example, the collector element of transistor 92 is connected in feed back over line 94 to the input or base element of the first transistor 88. Similarly, the collector element of transistor 93 is connected backwardly in feedback over line 95 to the base element of transistor 89. In each of these feed back paths over lines 94 and 95 there is provided a resistor 96 and 97 and, as shown, the resistance 96 in feed back line 94 may be made variable thereby to permit adjustment or balancing of the feedback signal as desired.

The output signal over line 98 of the amplifier is thus the combined signal output from the two channels of the differential power amplifier unit 23 and is therefore regulated and controlled to yield a zero signal whenever a zero input signal to the amplifier is received and to provide a substantially linear change in output over line 98 in proportion to the changes in input signal received over line 87.

What is claimed is:

1. In a frequency modulating carrier detector, a limiter circuit for clipping the signal to produce a substantially square wave output of the same frequency thereof, a variable frequency master oscillator producing a pair of like frequency standard signals of opposite phase with one of said standard signals being advanced substantially 90 degrees in phase with respect to the signal and with the other being retarded substantially 90 degrees in phase with respect to the signal, first and second gate circuits both responsive to said clipped signal with each being energized by a different one of said standard signals each thereby producing an output proportional to different half cycles of said clipped signal, means responsive to the output of both gate circuits for inverting one of said outputs and combining the inverted output with the other output to produce an alternating signal, and means for integrating said alternating signal to detect the modulating signal.

2. In a demodulator for frequency or phase shiftable signals, means for amplifying the signal and limiting its amplitude, to produce a series of variable frequency unidirectional intelligence pulses of substantially square waveshape, means for dividing each said intelligence pulse into two half pulses with the first pulse equalling substantially the first half of each said intelligence pulse and the second pulse equalling substantially the second half thereof, means for inverting each second half pulse and combining it with the first half pulse to produce an alternating pulse intelligence waveform, and means for integrating the alternating intelligence waveform to eliminate the noise components therein and demodulate the signal to obtain the desired intelligence therefrom.

3. A detector for determining the variation in phase or frequency of an alternating input signal comprising means responsive to said signal to provide a series of unidirectional impulses of varying frequency and phase corresponding to variations of the input signal, a pair of gate circuits energized by said unidirectional impulses, time control means for actuating said gates to close and open in time sequence whereby a first portion of each of said impulses passes through one of the gates and the remaining portion through the other of said gates, and means for integrating the difference between said first and second portions and energizing said control means in feedback according to the integrated difference thereby to vary the time of actuation of said gates to render said first and second input signal portions equal to one another.

4. In the detector of claim 3, said control means including an oscillator producing two series of signals in phase opposition, and means directing one series of signals to energize a first gate and the second series to energize the second gate.

5. In the detector of claim 4 said difference integrating means including means for inverting the phase of the first portion of said input signal with respect to the other, and means integrating the sum of the inverted first portion and second portion.

6. A phase detector for determining variation in phase of a series of unidirectional input impulses, comprising means energized by a reference signal generating means for separating each of said input impulses into two components, each containing a portion of the energy of said input impulse and in summation equaling the energy of the input impulses, means for integrating the difference between the first and second components to derive an error signal and means varying said reference signal generating means by said error signal to continually maintain the energy contained in said first and second components equal, whereby said error signal is proportional to the variation in phase of said input impulse.

7. In a phase shiftable signal demodulator, means for limiting the amplitude of the signal to produce substantially square waveshape pulses that vary in frequency in proportion to the transmitted intelligence, a master oscillator producing impulses of frequency in the same bandwidth as the signal, means comparing the frequency of the master oscillator signal with the signal to produce an error signal, and means for varying the frequency of the master oscillator by said error signal to bring it into synchronism with the signal whereby said error signal constitutes the desired demodulated intelligence signal, said comparing means comprising means responsive to said master oscillator and to said unidirectional pulses for producing two series of impulses, each of the same frequency as said pulses, with the pulses of the first series being of greater pulse width than those of the second when the frequency of the master oscillator signals is greater than that of the signal and with the pulses of the first series being of smaller pulse width than those of the second when the frequency of the master oscillator signals is less than that of the signal, and means for determining the difference between the pulse width of the first and second series thereby to obtain the desired error signal.

8. In a phase shiftable signal demodulator, means for limiting the amplitude of the signal to produce substantially square waveshape pulses that vary in frequency in proportion to the transmitted intelligence, a master oscillator producing impulses of frequency in the same bandwidth as the signal, means comparing the frequency of the master oscillator signal with the signal to produce an error signal, and means for varying the frequency of the master oscillator by said error signal to bring it into synchronism with the signal whereby said error signal constitutes the desired demodulated intelligence signal, said comparing means comprising means responsive to said master oscillator and to said unidirectional pulses for dividing said pulses into two series of pulses of the same frequency, with the first series having a waveform substantially identical with the first half of said pulses and with the second series having a waveform substantially identical with the second half of the pulses and with the first series having a pulse width greater than the second series or less than that of the second series depending upon whether the frequency of the master oscillator exceeds that of the signals or is less than that of the signals, and means for integrating the difference between the two series thereby to obtain the error signal.

9. In a transistorized frequency modulated signal detector, transistor means for clipping the signal to produce substantially square waveshape pulses, a transistor multivibrator operating in the same frequency bandwidth as the signal, transistor means comparing the frequency of the multivibrator with the signal to produce an error signal, and means for varying the frequency of the multivibrator by said error signal to synchronize said multivibrator frequency with the signal, said comparing means including a pair of transistor gate circuits, each responding to said signal and to said transistor multivibrator for producing a series of impulses having the same frequency as said signal, with the pulses from one gate circuit being of greater pulse width than those of the second gate when the frequency of the multivibrator exceeds that of the signal and being of smaller pulse width than of the second when the multivibrator frequency is lower than that of the signal, and transistor means for determining the difference between the pulse width of the first and second series thereby to obtain the error signal.

10. Means for demodulating a phase or frequency shifted carrier signal comprising: a variable frequency transistor oscillator operating in the same bandwidth as the signal, and producing a pair of like frequency reference signals of opposite polarity, with one reference signal being advanced in phase by 90° with respect to said selected signal and the other reference signal being retarded in phase by the same amount when the oscillator is in frequency synchronism with the signal, and means responsive to said pair of reference signals and to said signal to vary the frequency of said oscillator with variation in said signal thereby to maintain one of said pair of reference signals advanced in phase and the other of said reference signals retarded in phase by equal amounts with respect to said signal, said means for varying the frequency of the oscillator including a pair of transistor clamping and gate circuits, each being responsive to the signal and to a different one of said frequency reference signals, a pair of transistors in back-to-back relation with each being energizable by a different one of said transistor clamping and gate circuits, and means responsive to the back-to-back arranged transistors for energizing said oscillator to controllably vary the frequency thereof.

11. Means for demodulating a phase or frequency shifted carrier signal comprising: a variable frequency transistor oscillator operating in the same bandwidth as the signal, and producing a pair of like frequency reference signals of opposite polarity, with one reference signal being advanced in phase by 90° with respect to said selected signal and the other reference signal being retarded in phase by the same amount when the oscillator is in frequency synchronism with the signal, and means responsive to said pair of reference signals and to said signal to vary the frequency of said oscillator with variation in said signal thereby to maintain one of said pair of reference signals advanced in phase and the other of said reference signals retarded in phase by equal amounts with respect to said signal, said means for varying the frequency of the oscillator including a pair of transistor clamping and gate circuits, each being responsive to the signal and to a different one of said frequency reference signals, a pair of transistors in back-to-back relation with each being energizable by a different one of said transistor clamping and gate circuits, and means responsive to the back-to-back arranged transistors for energizing said oscillator to controllably vary the frequency thereof, said oscillator including two pairs of directly coupled transistors, feedback circuit means interconnecting the transistors of each pair to provide stabilization against temperature variation, means interconnecting both pairs in feedback relation through reactance means, and means responsive to said error signal for varying the voltage biasing of both pairs thereby to vary the frequency of said oscillator.

12. In the detector of claim 9, said difference determining means including a pair of transistors in reversely poled circuit connection, means interconnecting each of said pair of transistors to receive impulses from a different one of the gate circuits, and means for averaging the outputs of the opposing transistors thereby to obtain the error signal.

13. In a detector, a transistor multivibrator of variably controllable frequency in the same bandwidth as the signal and producing two series of output pulses of opposite phase, a pair of transistor gate circuits, each energized by a different series of said output pulses and both being responsive to said signal, a first transistor circuit responsive to one of said gates and a second transistor circuit responsive to the other, said transistor circuits being connected in opposition whereby the output of one is inverted with respect to the other, and averaging means for averaging the opposing outputs of said transistor circuits thereby to obtain an error signal that is proportional to the change in phase of the signal.

14. In a frequency modulated signal detector, a saturation transistor circuit for clipping the received signals, a pair of transistor gate circuits responsive to phase displaced standard pulses of substantially the same frequency as the received signal and responsive to the clipped received signal for dividing the clipped signal into two parts, transistor means responsive to the gate circuits for comparing the energy contained in the two parts and producing an error signal proportional to the energy difference thereof, a transistor multivibrator for producing said phase displaced standard pulses, and means for energizing said multivibrator with said error signal to vary the frequency thereof in such direction as to minimize the error signal.

15. A detector for frequency and phase modulated alternating current signals comprising: means responsive to said signals for producing a series of substantially unidirectional impulses corresponding in waveshape and spacing with every other half cycle of the alternating current signal, said impulses having noise components at the leading edges and trailing edges of each impulse, time controlled means for dividing each said impulse into two unidirectional impulse portions with the first impulse portion corresponding in waveform with the leading half of the impulse and the second pulse portion with the trailing half of the impulses, means integrating the difference of said first and second unidirectional pulse portions, thereby to nullify the noise components at the leading edges and trailing edges of each impulse, and produce an output error signal corresponding to the integrated difference, and means responsive to the error signal for energizing said time control means to continuously vary the relative pulse widths of the first and second portions thereby to maintain said difference at substantially null, whereby said error signal corresponds to the demodulated signal.

16. In a demodulator for a frequency or phase modulated alternating current signal, means responsive to said signal for producing a series of unidirectional impulses corresponding in time duration and spacing with each like polarity half cycle of the alternating current input signal, a pair of sequentially operating gate circuits adapted to be operated during the time interval of each unidirectional impulse for separating a leading portion of each impulse from a trailing portion thereof, means for integrating the difference between said leading portion and trailing portion to produce a variable error signal, and means responsive to said error signal for continuously controlling the time of operation of said gates to maintain said leading portion and trailing portion substantially equal, whereby said variable error signal constitutes the demodulated output signal.

References Cited in the file of this patent

UNITED STATES PATENTS

| | | |
|---|---|---|
| 2,588,094 | Eaton | Mar. 4, 1952 |
| 2,598,084 | Tellier | May 27, 1952 |
| 2,707,209 | Ambrosio | Apr. 26, 1955 |
| 2,744,247 | Wilmotte | May 1, 1956 |
| 2,885,553 | Albro | May 5, 1959 |
| 2,904,683 | Meyer | Sept. 15, 1959 |
| 2,905,812 | Doelz et al. | Sept. 22, 1959 |
| 2,911,528 | McRae | Nov. 3, 1959 |